US009928506B2

(12) United States Patent
Girish

(10) Patent No.: US 9,928,506 B2
(45) Date of Patent: Mar. 27, 2018

(54) DYNAMIC CHECKOUT BUTTON APPARATUSES, METHODS AND SYSTEMS

(71) Applicant: Visa International Service Association, San Francisco, CA (US)

(72) Inventor: Aparna Krishnan Girish, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 14/792,517

(22) Filed: Jul. 6, 2015

(65) Prior Publication Data

US 2016/0005030 A1    Jan. 7, 2016

Related U.S. Application Data

(60) Provisional application No. 62/021,187, filed on Jul. 6, 2014.

(51) Int. Cl.
| | |
|---|---|
| *G06Q 20/10* | (2012.01) |
| *G06Q 20/36* | (2012.01) |
| *G06Q 30/06* | (2012.01) |
| *G06F 17/30* | (2006.01) |
| *G06Q 20/32* | (2012.01) |

(52) U.S. Cl.
CPC ..... *G06Q 20/363* (2013.01); *G06F 17/30864* (2013.01); *G06Q 20/322* (2013.01); *G06Q 30/0601* (2013.01); *G06Q 30/0641* (2013.01)

(58) Field of Classification Search
CPC .................................................... G06Q 20/10

USPC ........................................................ 705/39
See application file for complete search history.

(56) References Cited

U.S. PATENT DOCUMENTS

| | | |
|---|---|---|
| 5,960,411 A | 9/1999 | Hartman et al. |
| 5,986,654 A | 11/1999 | Alexander et al. |
| 2003/0115549 A1 | 6/2003 | Ward |
| 2008/0147566 A1 | 6/2008 | Malik |
| 2008/0167962 A1 | 7/2008 | Lawe |
| 2009/0265247 A1 | 10/2009 | Carroll et al. |
| 2012/0150606 A1 | 6/2012 | Navar et al. |
| 2012/0166268 A1 | 6/2012 | Griffiths |
| 2014/0074655 A1 | 3/2014 | Lim et al. |
| 2014/0244494 A1 | 8/2014 | Davis et al. |
| 2015/0100417 A1 | 4/2015 | Girish |

OTHER PUBLICATIONS

International Seraching Authority, International Search Report and Written Opinion issued in International Application No. PCT/US15/39266, dated Oct. 7, 2015, 6 pages.
How to Create a Customized PayPal Payment Button (Jun. 10, 2009), available at https://web.archive.org/web/20111011135013/http://www.wendycholbi.com/how-to-create-a-customized-paypal-payment-button/.

*Primary Examiner* — Lindsay M Maguire
(74) *Attorney, Agent, or Firm* — Loeb & Loeb LLP

(57) ABSTRACT

The DYNAMIC CHECKOUT BUTTON APPARATUSES, METHODS AND SYSTEMS ("DCB") transforms product page checkout request input and user identification input via DCB components such as offer/discount determination component and checkout button embedding component, into dynamic checkout button outputs.

18 Claims, 9 Drawing Sheets

Example Data Flow

FIGURE 3 — Example DCB components

DYNAMIC CHECKOUT BUTTON APPARATUSES, METHODS AND SYSTEMS

This application claims priority to U.S. provisional patent application Ser. No. 62/021,187, filed Jul. 6, 2014, entitled "Dynamic Checkout Button Apparatuses, Methods and Systems." The entire contents of the aforementioned applications are expressly incorporated by reference herein.

This application for letters patent disclosure document describes inventive aspects directed at various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations are directed generally to e-commerce and digital wallets, and more particularly, to DYNAMIC CHECKOUT BUTTON APPARATUSES, METHODS AND SYSTEMS.

BACKGROUND

Consumers using the World Wide Web browse product listings of merchants and make purchases on selected products. Discounts are offered to consumers for their purchases. Consumer may use several payment accounts but consumers often are confused over which account to use or which image represents which card.

BRIEF DESCRIPTION OF THE DRAWINGS

The accompanying appendices and/or drawings illustrate various non-limiting, example, innovative aspects in accordance with the present descriptions.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

DCB

Figure 1A:
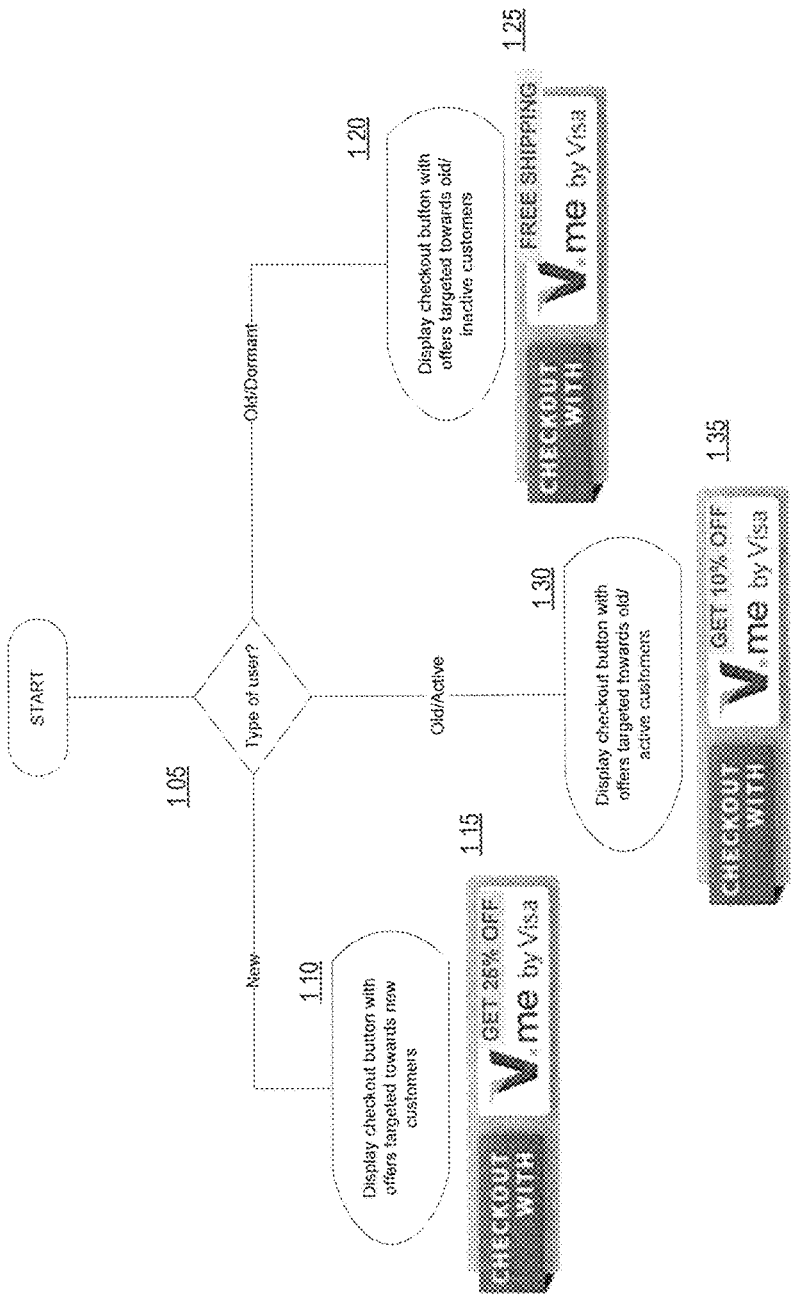
FIGS. 1A-1B show block diagrams illustrating example embodiments of the DCB.

The DYNAMIC CHECKOUT BUTTON APPARATUSES, METHODS AND SYSTEMS ("DCB") transforms inputs such as product page checkout request and user identification input (e.g., 211) via DCB components such as offer/discount determination component 841 and checkout button embedding component 842, into dynamic checkout button (e.g., 265) outputs. FIG. 1A shows a block diagram illustrating example embodiments of the DCB. In some embodiments, the DCB may determine what type is the user 105. If the user is a new user, the DCB may display the wallet checkout button with offers targeted towards new customers 110, e.g., get 25% off 115. If the user is an existing and active user, the DCB may display checkout button with offers targeted towards existing/active customers 130, e.g., get 10% off 135. If the user is an existing but dormant user, the DCB may display checkout button with offers targeted towards old/inactive customers 120, e.g., get free shipping when purchase 125.

Figure 1B:

FIG. 1B shows a block diagram illustrating example offers/discounts embedded in the wallet checkout button in some embodiments of the DCB. In some embodiments, the discount/offer may come with a timer which shows how much time left for the discount/offer to be active. For example, it may show "time left to checkout with 40% off is 10 minutes." 150 And time left may count down 155. The discount/offer may also change as the time counts down. For example, the discount may change from 35% off at 7 minutes 160 to 30% off at 6 minutes 165, and 25% off at 5 minutes 170, etc. In some embodiments, the discount/offer may also be customizable and user specific, as the DCB may have access to the user's wallet account which stores the user's profile information, payment methods information, shipping address, and/or the like. For example, it may display a message like "Hi John, checkout now and get 3000 points to your Amex card." 175 For another example, it may display a message such as "Hi John, use your discover card and get 5% cash back on your purchase." 180 The DCB may also do analytics on the merchant's site or across the web and display such analytics that's of interest to the user. For example, it may display a message which shows historical lowest price of the product on this merchant site 185. For another example, it may display a lower price at another merchant 190.

Figure 2:
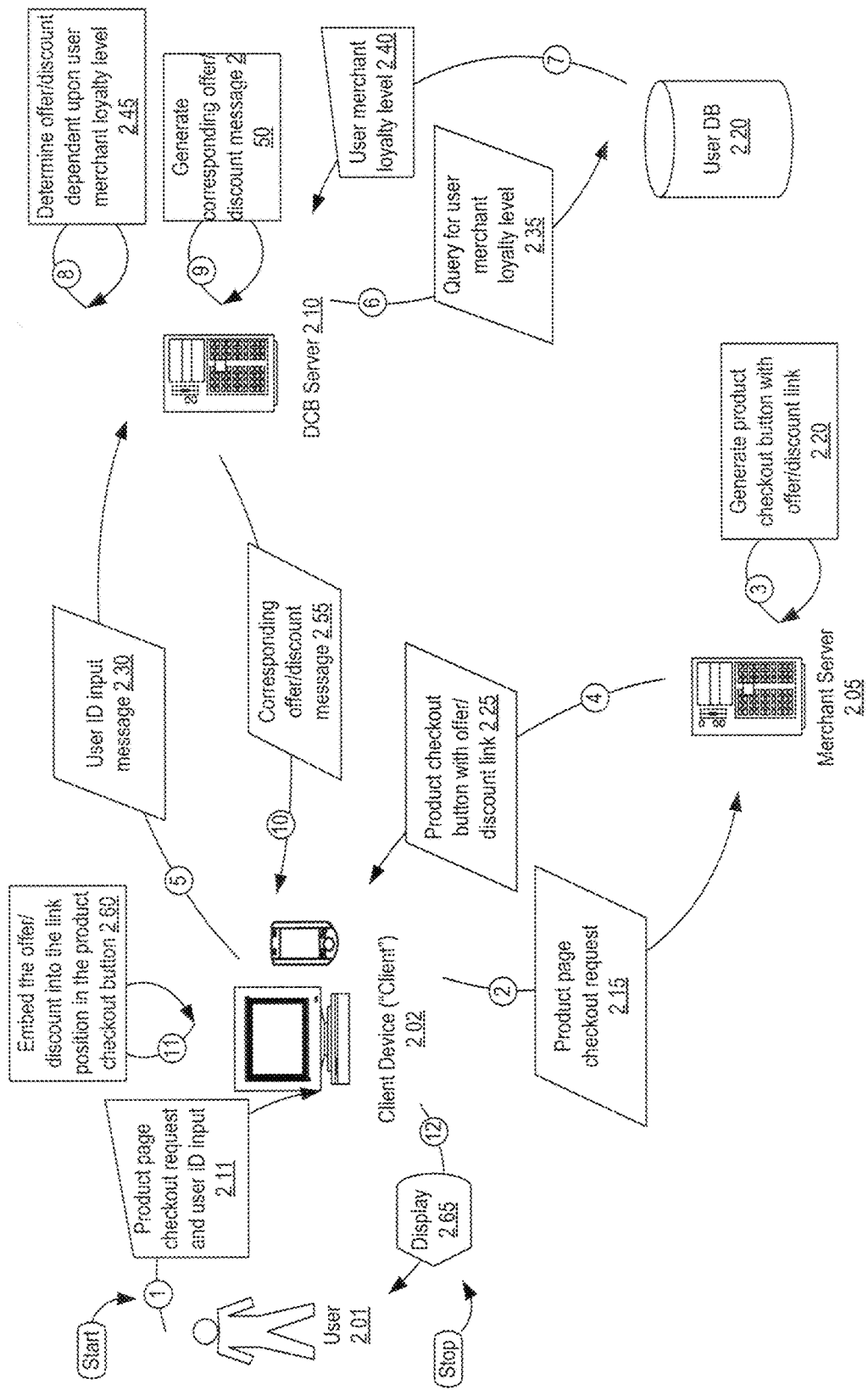
FIG. 2 shows a block diagram illustrating example data flow in some embodiments of the DCB.

FIG. 2 shows a block diagram illustrating example data flow in some embodiments of the DCB. In some embodiments, the user 201 (e.g., consumer) may send a product page checkout request and user identification input 211 to the client 202 (e.g., mobile devices, computer, Point-of-Sale, laptop, and/or the like). The client may further send the product page checkout request 215 to the merchant server 205. For example, the merchant server may provide a HTTP(S) GET message including an XML-formatted product page checkout request 215 similar to the example listing provided below:

```
GET /productpagecheckoutrequest.php HTTP/1.1
Host: www.merchantserver.com
Content-Type: Application/XML
Content-Length: 624
<?XML version = "1.0" encoding = "UTF-8"?>
<product_page_checkout_request>
    <session_ID>4NFU4RG94</session_ID>
    <timestamp>2001-02-22 15:22:43</timestamp>
    <wallet_login_username>jsmith@wallet.com</wallet_username>
    <wallet_login_password>xxxxxx<wallet_login_password>
    <merchant_ID>www.macys.com</merchant_ID>
    <client_details>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
    </client_details>
    <product_info>
        <cart_id>45234</card_id>
        <product_id>123
            <product_name>book</product_name>
            <product_price>$12</product_price>
```

```
        </product_id>
        <product_id>456
            <product_name>boots</product_name>
            <product_price>$433</product_price>
        </product_id>
    </product_info>
</product_page_checkout_request>
```

The merchant server may generate product checkout button with offer/deal link to be embedded 220. The merchant server may then send the product checkout button with offer/deal link to be embedded 225 to the client. For example, the merchant server may provide a HTTP(S) POST message including an XML-formatted product checkout button with offer/discount link message 225 similar to the example listing provided below:

```
<html>
    <head>
        <script type="text/javascript">
        /**
        inputData is the JSON object: {amount: .., city: .., state: ..,....}
        resumeFunction is what you call after you figured the summary
        details.
        **/
        function myBeforeSummaryFunction(inputData,
        resumeFunction){
            $.ajax({
                url: '/path/to/your/server/to/compute/the/summary',
                data: inputData,
                success: function(response){
                    resumeFunction(response); //response should be
                    the summary object
                }
            });
        }
        function myCallbackFunctionForVmeEvents(VmeEventType,
        eventData){
            var MerchantTrans = eventData.merchTrans;
            if (VmeEventType == "purchase.success"){
                alert ( msg );
                mywindow = window.open
                ("./checkyourorder.php?merchTrans="
                + MerchantTrans,"Check your Order
                ID","width=400,height=300");
                mywindow.moveTo(300,300);
            }
        }
        </script>
    </head>
    <body>
        <v:init apikey="CG6KBNNKJ5ZSSJC5XTEX">
        </v:init>
        <v:buy
            apikey = "aK2Leiv89j2A1_lOn4s1"
            token = "12f049788f4b67dc9cc58529769fb9d2"
            amount = "100"
            currency = "USD"
            product-id = "cart-2536"
            before-summary="myBeforeSummaryFunction"
            callback="myCallbackFunction"
            collect-shipping="true"
            process="validate"
        </v:buy>
            <div id="v-root"></div>
            <script type="text/javascript" src="
            https://sandbox-static.v.me/js/1/v-widgets.js
            "></script>
<offer_link>link to DCB server decided offer</offer_link>
    </body>
```

Upon receiving the user identification input, the client may send the user identification input message to 230 to the DCB server 210. The DCB server may generate and send a query to the user database 220 for user merchant loyalty level 235. For example, the database may be a relational database responsive to Structured Query Language ("SQL") commands. The DCB server may execute a hypertext preprocessor ("PHP") script including SQL commands to query the database for user merchant loyalty level. An example PHP/SQL command listing, illustrating substantive aspects of querying the user database 235, is provided below:

```
<?PHP
header('Content-Type: text/plain');
mysql_connect("254.93.179.112",$DBserver,$password); // access
database server
mysql_select_db("customerprofile.SQL"); // select database table
to search
//create query for user merchant loyalty level data
$query = "SELECT user_merchant_loyalty_level FROM
CustomerProfileTable WHERE user_ID LIKE '%' $123abc";
$result = mysql_query($query); // perform the search query
mysql_close("customerprofile.SQL"); // close database access
?>
```

Upon receiving the user merchant loyalty level 240, the DCB server may determine offer/deal dependent upon user merchant loyalty level 245. For example, the user merchant loyalty level data may show that the user is a new user, the DCB server may determine an offer/discount for new users. The user merchant loyalty level data may also include user profile information and/or any other information stored in the user's wallet. Therefore, the offer/discount message may also include any information from the user's wallet. The DCB server may also determine other user specific behavior based on the information stored in wallet (e.g., 150, 155, 160, 165, 170, 175, 180, 185, 190, and/or the like). Once the DCB server determine the offer/discount 245, the DCB server may continue to generate corresponding offer/discount message 250. The DCB server may further send the corresponding offer/deal message 255 to the client. For example, the DCB server may provide a HTTP(S) POST message including an XML-formatted corresponding offer/deal message 255 similar to the example listing provided below:

```
POST /correspondingoffermessage.php HTTP/1.1
Host: www.DCBserver.com
Content-Type: Application/XML
Content-Length: 624
<?XML version = "1.0" encoding = "UTF-8"?>
<corresponding_offer_message>
    <session_ID>4NFU4RG94</session_ID>
    <timestamp>2001-02-22 15:22:43</timestamp>
    <wallet_login_username>jsmith@wallet.com</wallet_username>
    <wallet_login_password>xxxxxx<wallet_login_password>
    <merchant_ID>www.macys.com</merchant_ID>
    <client_details>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
    </client_details>
    <offer_link>25% off</offer_link>
</corresponding_offer_message>
```

The client may embed the offer/discount into the link position in the product checkout button 260, for display 265. An example HTTP message may be as follows:

```
<html>
    <head>
        <script type="text/javascript">
```

-continued

```
/**
    inputData is the JSON object: {amount: .., city: .., state: ..,....}
    resumeFunction is what you call after you figured the
    summary details.
**/
function myBeforeSummaryFunction(inputData,
resumeFunction){
    $.ajax({
        url: '/path/to/your/server/to/compute/the/summary',
        data: inputData,
        success: function(response){
            resumeFunction(response); //response should be
            the summary object
        }
    });
}
function myCallbackFunctionForVmeEvents(VmeEventType,
eventData){
    var MerchantTrans = eventData.merchTrans;
    if (VmeEventType == "purchase.success"){
        alert ( msg );
        mywindow = window.open
        ("./checkyourorder.php?merchTrans="
        + MerchantTrans,"Check your Order
        ID","width=400,height=300");
        mywindow.moveTo(300,300);
    }
}
</script>
</head>
<body>
    <v:init apikey="CG6KBNNKJ5ZSSJC5XTEX">
    </v:init>
    <v:buy
        apikey = "aK2Leiv89j2A1_lOn4s1"
        token = "12f049788f4b67dc9cc58529769fb9d2"
        amount = "100"
        currency = "USD"
        product-id = "cart-2536"
        before-summary="myBeforeSummaryFunction"
        callback="myCallbackFunction"
        collect-shipping="true"
        process="validate"
</v:buy>
    <div id="v-root"></div>
    <script type="text/javascript" src="
    https://sandbox-static.v.me/js/1/v-widgets.js
    "></script>
<offer_link>25% off</offer_link>
</body>
```

Figure 3:
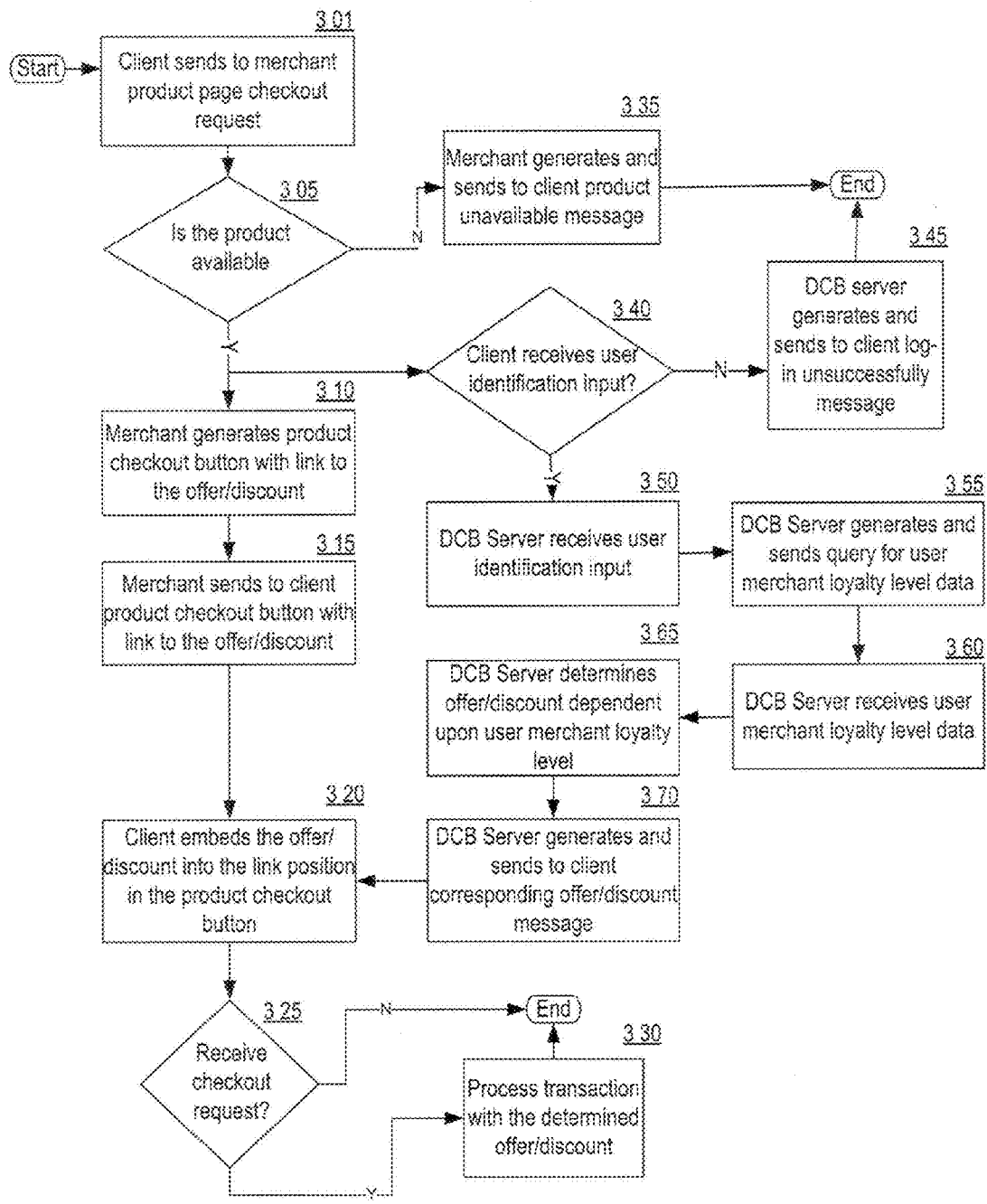
FIG. 3 shows a logic flow diagram illustrating example component in some embodiments of the DCB.

FIG. 3 shows a logic flow diagram illustrating example component in some embodiments of the DCB. In some embodiments, the client may send to merchant server a product page checkout request 301. The merchant server may determine if the product is available 305. If the product is available, the merchant server may generate and send to client a product checkout button with link to the offer/discount to be embedded 310. If the client also receives user identification input 340 from the user, the client may send the user identification input to the DCB server 350. The DCB server may generate and send to user database a query for user merchant loyalty level data 355. Upon receiving the user merchant loyalty level data 360, the DCB server may determine offer/discount dependent upon user merchant loyalty level 365. The DCB server may generate and send to client corresponding offer/discount message 370. Once the client receives the product checkout button with link to the offer/discount to be embedded from the merchant 315, and the corresponding offer/discount message from the DCB server 370, the client may embed the offer/discount into the link position in the product checkout button 320. Once the user is ready to checkout, the user may send the checkout request to the client 325 and the DCB server may process transaction with the determined offer/discount 330. If the client does not receive user identification input 340, the DCB server may generate and send to client log-in unsuccessfully message 345. If the product is not available 305, the merchant may generate and send to client product unavailable message 335 and end the process.

Figure 4:
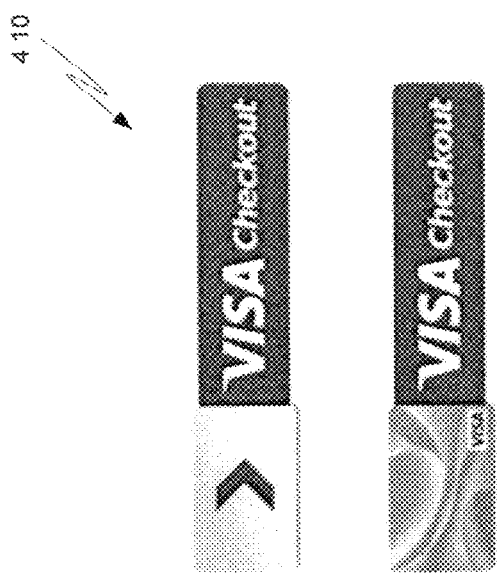
FIGS. 4-7 show additional example embodiments of the DCB.
Figure 5:

FIGS. 4 and 5 illustrate the wide scope of the systems and methods described herein. As shown in FIGS. 4 and 5, the systems and methods can be configured to have many different types of checkout buttons used in the processing described above. These include, but are not limited to dynamic texts; dynamic images (including photos (e.g., photo of the consumer, photo of a favorite pet, etc.), card art, product images, or any other image or images); dynamic colors; dynamic vignettes; dynamic timers/calendars/reminders; moving images (images change over time), video, etc.

FIG. 4 depicts dynamic images at 410 including card art and other types of dynamic images. As shown in FIG. 4, the card art of the consumer's default card is placed on the checkout button when the system recognizes the consumer (either by cookie, device fingerprint, etc.) and the consumer has a type of "remember me" capability enabled. If these conditions are satisfied in this example, the system will serve a button back as depicted in FIG. 4. The gray card and swoosh (upper checkout button in FIG. 4) is the unrecognized button, and the one with the gold card (lower checkout button in FIG. 4) represents where the recognized default card art would go. The card art could be, for example, the consumer's B of A Rewards Card. In some embodiments, the card art may represent which account of several accounts a user is using for the present transaction. For example, a user may have a B of A Rewards Card and a Local Bank Card and the card art may visibly represent which card is being used for a particular transaction.

In some embodiments, a user may be able to select the art that is displayed as part of the transaction to make it easier to determine which account is being used for a transaction. For example, B of A may have card art available which replicates the look of a B of A card in possession of the user. In addition, a user may be able to select or create additional card art that represents an account. An older user may wish to have larger lettering for example and the lettering may be modifiable by a user. Another user may wish for a first card to be colored red indicating that the card already has a high balance and should not be used and another card may be colored green indicating the card does not have a balance and should be used.

In yet a further embodiment, the card art may indicate the balance in the account related to the payment device or card. As an example, a user may set balance limits and if the amount in an account is over or under the limit, the card art may change. The threshold may be set by the user or may be set by the issuer or may be set by an authority and the threshold may use real time communication and account data to set the appearance to indicate a current status of one or more of the accounts to a user.

In yet another embodiment, the card art may indicate the results of an algorithm that analyzes a variety of factors to recommend one payment account over another. The factors could include the retailer, the type of good or service to be purchase, the price of the good or service, the rewards offered for using each payment account for different goods or services at different vendors, etc. As a more specific example, if the user wants to maximize the cash back from payment devices and the user is buying gasoline, the algorithm may review the various accounts of the user to determine which account would result in the largest cash back reward.

The card art may also include additional computer executable instructions that may affect the display in the button. For example, the computer executable instructions may also include instructions for the card art to flash, move, change color, change in size or make a sound. For example, as the user swipes to pay, the size of the card art may increase or a given sound may play. The display change may be user selected or may be selected by the card issuer, the issuing bank, etc.

FIG. 5 depicts other non-limiting examples of dynamic images at 510. These include discount information that can change over time. For example, the discount may be a 25% a first point in time but at a different discount level at a subsequent period in time. As another example, information that dynamically changes over time can be inserted into the checkout button including not only what the price or discount may be, but also the specific store or website containing such an offer. The checkout button and further include a continuously updated clock (e.g., a five-minute, one minute, 15 second interval). Still further, a checkout button can be customized to include personal information such as the user's name as well as earning rewards (e.g., points, free shipping, etc.) by the user selecting the checkout button. Customization in this way operates as a further enticement for the user to effect a purchase via the checkout button.

screen devices, etc). To help in achieving personalization at these touchpoints, information can be obtained from various sources. Sources can include what information the user has already provided to an issuer and/or merchant. In some situations, information already stored at the issuer and/or merchant servers can be combined in order to derive the proper personal information (e.g., textual information, image information, etc.) to be inserted into a checkout button. Other sources of information that can be used independently or in conjunction with the aforementioned include information stored in cookies on the user's device. Cookies can include those that track user's shopping behavior across one or more shopping-related or other type of websites.

For example user-specific information can be obtained so that the person's purchase card(s), username, or other specific information can be utilized in dynamically creating a checkout button. Other customizations can include analyzing the purchase history of the user and determining what products the customer has a higher probability of purchasing. As another example, the system can determine that the user frequents the merchant's website and therefore qualifies to have a better offer placed in the checkout button. In other situations, the deeper the relationship between the user and/or the merchant and/or the issuer, the more user-specific and/or generous offers/data can be placed in the checkout button.

Code to enable obtaining merchant information to display in the button may be as follows:

```
var r = new XMLHttpRequest( ), url;
url = locationOrigin( ) + '/wallet-services-web/merchant?profileOwner=' +
         __param('externalClientId') + '&profileName=' + __param('externalProfileId'); (this is
the api for getting the merchant's information)
         r.open('GET', url, true);
         r.setRequestHeader('Accept','application/json');
         r.setRequestHeader('Content-type','application/json');
         r.setRequestHeader('API_KEY', __param('apikey'));
         r.setRequestHeader('X-MERCHANT-API-KEY', __param('apikey'));
         r.setRequestHeader('X-CORRELATION-ID', '<%= response.getHeader("X-
CORRELATION-ID") %>');
         r.onreadystatechange = function( ) {
             if (r.readyState == 4) {
                 if (r.status === 401) {
                     <% /* if not active, hide button (by sending postMessage) */ %>
                     // have to send it with this admittedly odd format to match our existing
                     // post-message handling in the wrapper post_message.js
                     window.parent.postMessage('hide--{ }', postMessageTarget); (A hidden button
would not be visible to users)
                 } else if (r.status === 400 || r.status === 404) {
                     window.parent.postMessage('lockButton--{ }', postMessageTarget); (A locked
button would be greyed out but visible to users)
                 } else if (r.status === 200) { (Merchant is active, api key is valid, so render the
dynamic button)
                     <% /* send some merchant config params back to sdk, which will pass them into
checkout widget via the url */ %>
                             if(browserLocale){
                                 window.parent.postMessage('merchantConfig--' + r.responseText+'--{ }--
'+'{"vInitRequest":{"browserLocale":"'+browserLocale+'"}}', postMessageTarget);
                             } else {
                                 window.parent.postMessage('merchantConfig--' + r.responseText,
postMessageTarget);
                             }
                 }
             }
         };
         r.send( );
```

Figure 6:
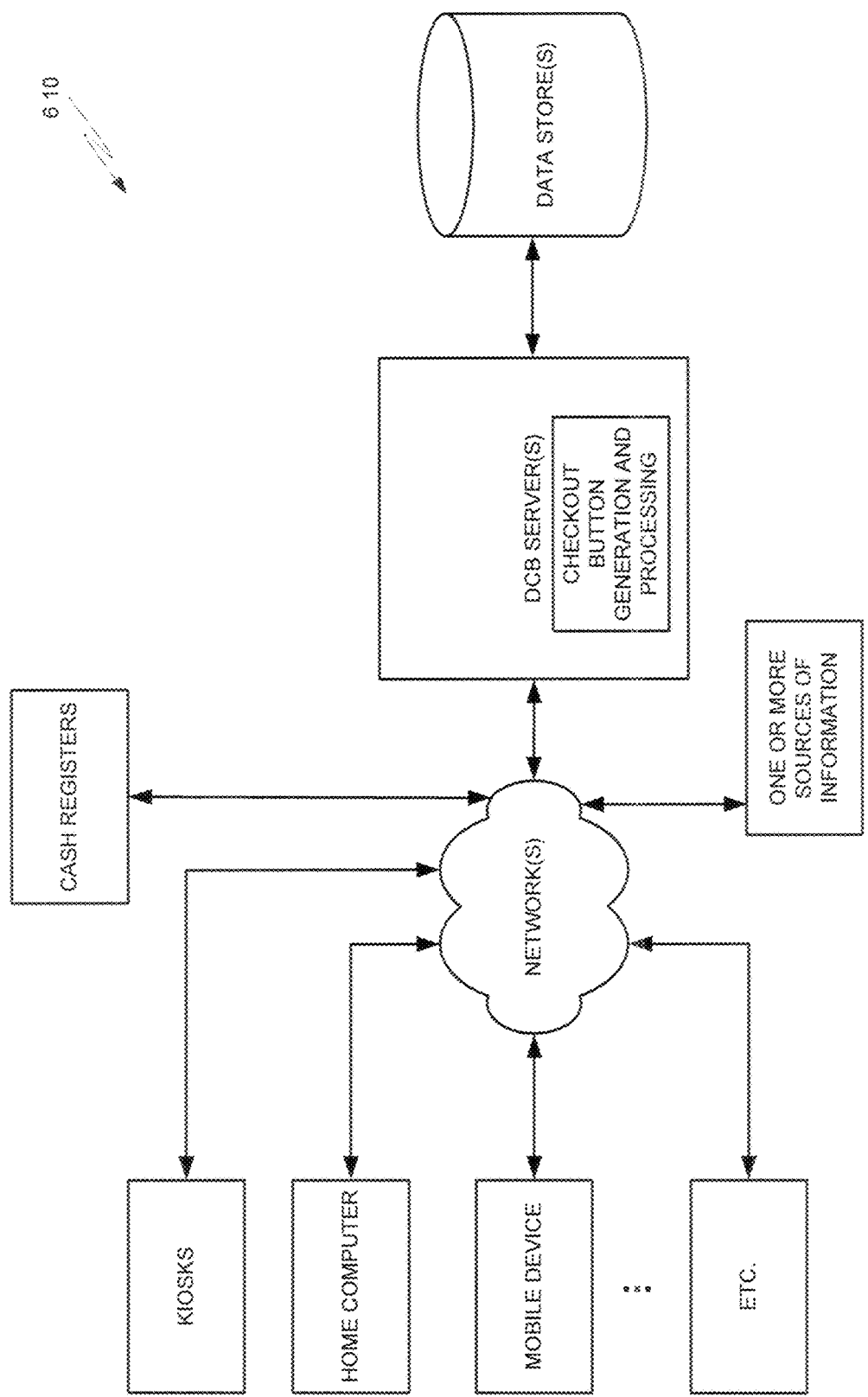

FIG. 6 depicts at 610 that checkout buttons can be supported via many different types of end touchpoints (e.g., web, mobile, wearables, kiosks, cash registers, other touch- In some embodiments, a decision may be made whether to render the button or hide the button depending on a response from a wallet server. For example, if card art is available, it may be displayed and if there is no card art, the button image may be a default image. Sample computer executable instructions to enable the render or hide the art in the button decision may be as follows:

```
var __lockedButtonPathSmall =
'checkout-widget/resources/img/integration/v1/locked-button-
s.png',
        __lockedButtonPathMedium =
    'checkout-widget/resources/img/integration/v1/locked-button-
m.png',
        __lockedButtonPathLarge =
    'checkout-widget/resources/img/integration/v1/locked-button-
l.png', (for showing a locked button to the user)
__lockButton = function(message, handleClick) {
        var images = document.getElementsByTagName('img'),
            vButtonPattern = /\bv-button\b/,
            clickHandler = function( ) {
                window.alert(message);
            },
            newWidth,
            i;
        for (i = 0; i < images.length; i++) {
            if (vButtonPattern.test(images[i].className)) {
                newWidth = __param('size',images[i].src) || 213;
                if (handleClick) {
                    images[i].onclick = clickHandler;
                }
                images[i].title = message;
                images[i].src = __getAssetsDomain( );
                switch (true) { (determine correct locked button image
to show based on merchant's preference via a "size" parameter merchant
passes to us)
                    case parseInt(newWidth, 10) < 213:
                        images[i].src += __lockedButtonPathSmall;
                        break;
                    case parseInt(newWidth, 10) >= 425:
                        images[i].src += __lockedButtonPathLarge;
                        break;
                    default:
                        images[i].src +=
                            __lockedButtonPathMedium;
                }
            }
        }
        __isLocked = true;
    },
__hideButton = function( ) {
        var buttonElements =
            window.parent.document.querySelectorAll('.v-button'),
            buttonElement,
            buttonIndex;
        for (buttonIndex = 0; buttonIndex <
buttonElements.length; buttonIndex++) {
            buttonElement = buttonElements[buttonIndex];
            buttonElement.style.visibility = 'hidden';
        }
    },
__receiveMessage = function(event) {
        var message = event.data.split('--'),
            data = { },
            error,
            sdkOptions,
            hideWidget,
            v1Merchant;
        if (message.length > 1) {
            data = JSON.parse(message[1]);
            if (message.length > 2) {
                error = JSON.parse(message[2]);
            }
            if (message.length > 3) {
                sdkOptions = JSON.parse(message[3]);
            }
        }
        if (data.merchantType !== 'v1') {
            data.vInitRequest = __merchantOpts;
        }
        delete data.merchantType;
        if (event.origin === __getDomain( )) {
            switch(message[0]) {
```

-continued

```
                case "success" :
                    try {
                        __successCallback(data);
                    }finally{
                        __hide( );
                    }
                    break;
                case "cancel" :
                    try {
                        __cancelCallback(data);
                    }finally{
                        if (hideWidget) {
                            __hide( );
                        }
                    }
                    break;
                case "error" :
                    try {
                        __errorCallback(data, error);
                    }finally{
                        if (hideWidget) {
                            __hide( );
                        }
                    }
                    break;
                case "lock" :
                    __errorCallback(data);
                    if (hideWidget) {
                        __hide( );
                    }
                    break;
                case "hide" :
                    __hideButton( );
                    break;
                case "lockButton" :
                    __lockButton(__integrationError, false);
                    break;
                case "merchantConfig":
                    if(sdkOptions.vInitRequest &&
                        sdkOptions.vInitRequest.browserLocale){
                            data.vInitRequest.browserLocale =
                                sdkOptions.vInitRequest.browserLocale;
                    }
                    __merchantConfig(data);
                    break;
            }
        }
    },
V.setOptions = function(options) {
        var buttons = document.querySelectorAll('.v-button'),
            i;
        for (i = 0; i < buttons.length; i++) {
            buttons[i].src = __getAssetsDomain( ) +
'/wallet-services-web/xo/button.png'; (if we are going to render an active
button then we make another call to Wallet Services Back End to get the
image)
            buttons[i].title = '';
        }
        // need to pass this to iframe due to security policy
        options.parentUrl = window.location.href;
        __merchantOpts = options;
        __getMerchantConfig(options);
    };
```

Logically, the computer executable instructions may be embodied in a purpose built processor or may be executed by another processor that is physically configured according to the computer executable instructions.

Figure 7:
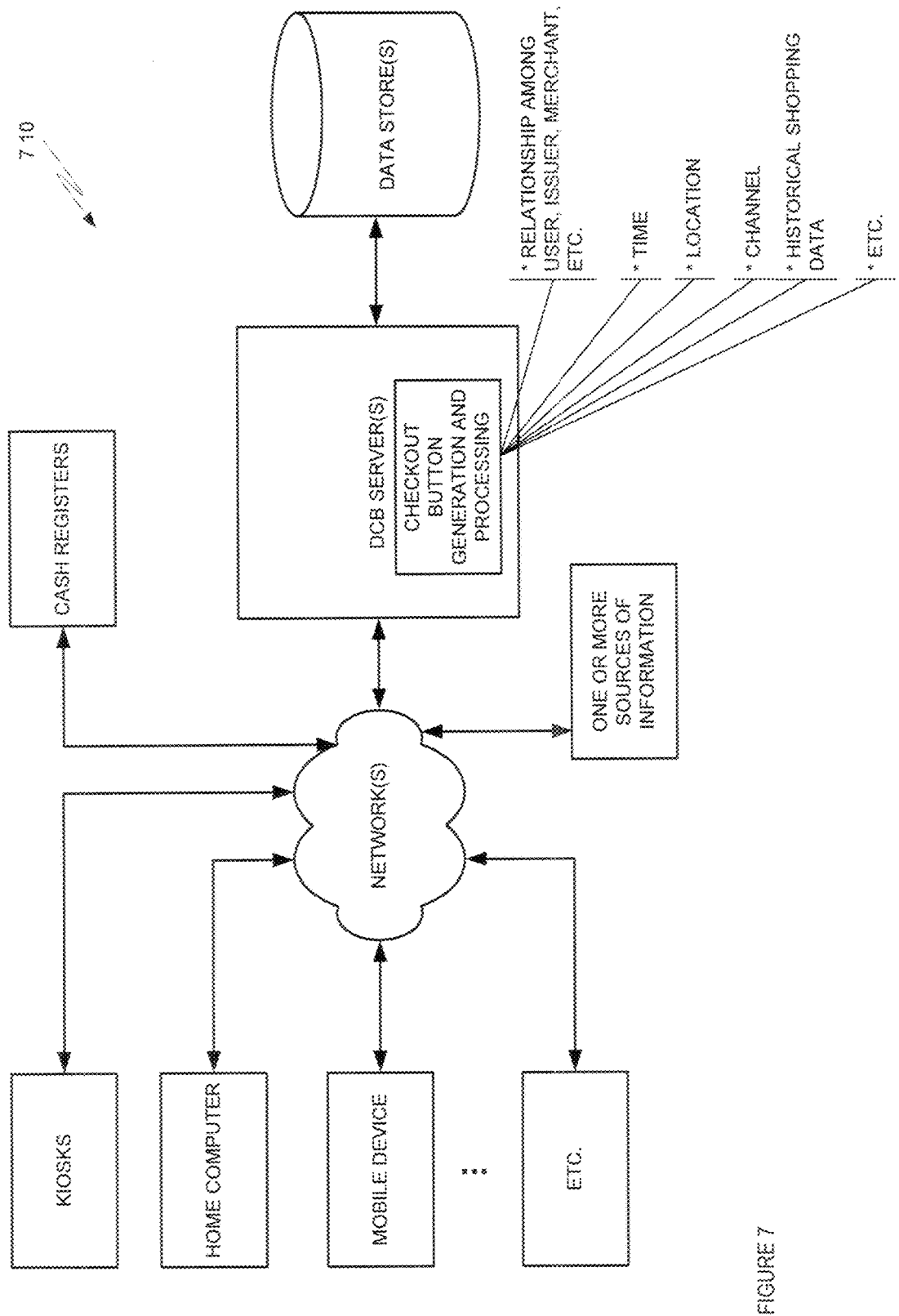

As shown at 710 in FIG. 7, the content of the checkout button can be based on many different types of data. For example, the time and location of the user can also be ascertained to supplement the information that is to be processed in order to generate the textual/image data for insertion into a checkout button. The textual/image data can also be tailored to the specific channel of the user (e.g., the user is on a mobile phone versus the user being at a kiosk or at a merchant-operated cash register).

Additionally, a greater degree of branding can be placed in the checkout buttons, such as colors that help identify the merchant or other company or logos of the merchant or other company. Because "real estate" is at a premium for a checkout button (e.g., a two inch-by-one inch sized checkout button), the data (e.g., images, text, etc.) can be tailored to the specific merchant and/or user in order to enhance the probability that the user will click on the checkout button.

DCB Controller

Figure 8:
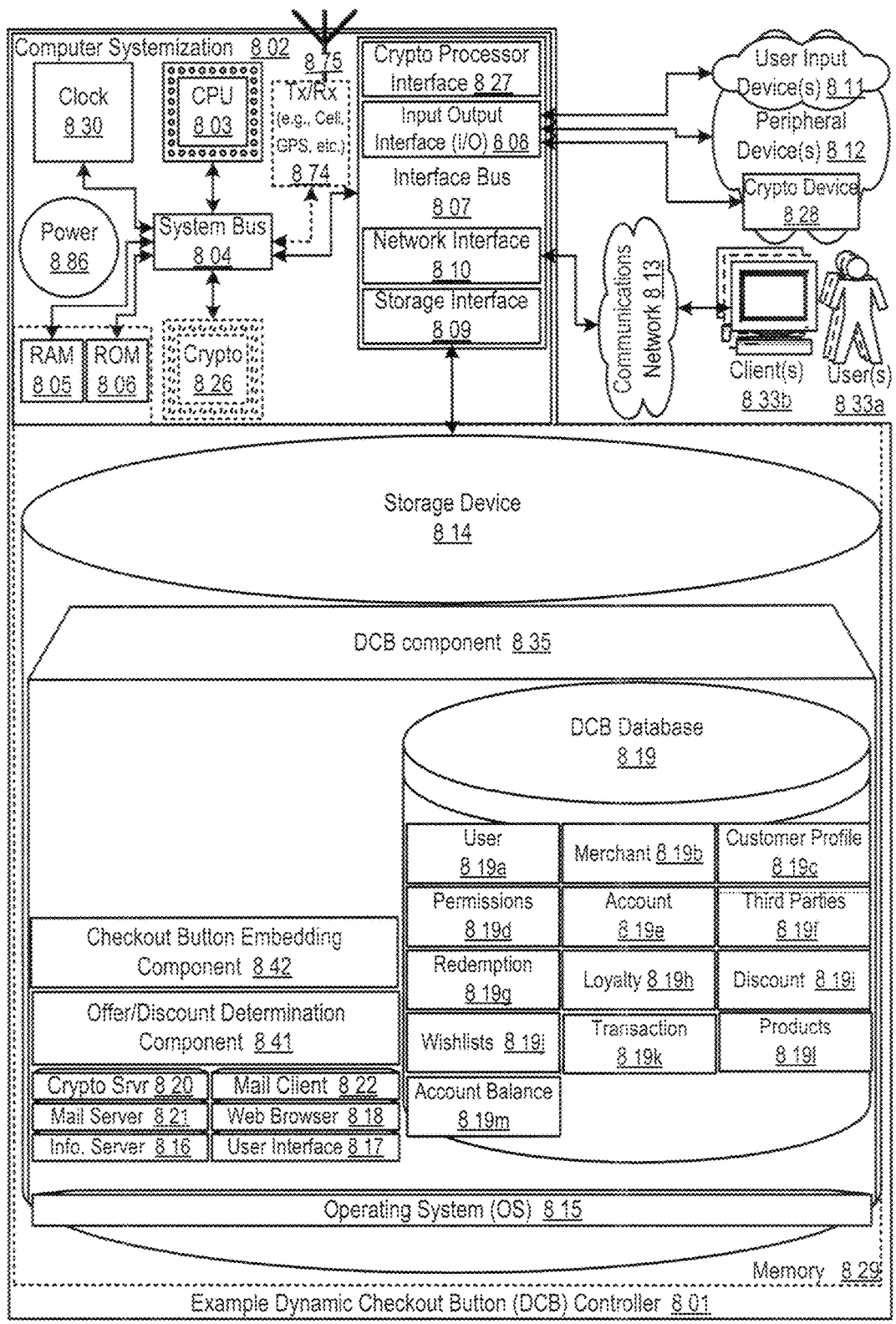
FIG. 8 shows a block diagram illustrating embodiments of a DCB controller.

FIG. 8 shows a block diagram illustrating embodiments of a DCB controller. In this embodiment, the DCB controller 801 may serve to aggregate, process, store, search, serve, identify, instruct, generate, match, and/or facilitate interactions with a computer through various bi-directional linking technologies, and/or other related data.

Typically, users, which may be people and/or other systems, may engage information technology systems (e.g., computers) to facilitate information processing. In turn, computers employ processors to process information; such processors 803 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 829 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the DCB controller 801 may be connected to and/or communicate with entities such as, but not limited to: one or more users from user input devices 811; peripheral devices 812; an optional cryptographic processor device 828; and/or a communications network 813.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The DCB controller 801 may be based on computer systems that may comprise, but are not limited to, components such as: a computer systemization 802 connected to memory 829.

Computer Systemization

A computer systemization 802 may comprise a clock 830, central processing unit ("CPU(s)" and/or "processor(s)" (these terms are used interchangeably throughout the disclosure unless noted to the contrary)) 803, a memory 829 (e.g., a read only memory (ROM) 806, a random access memory (RAM) 805, etc.), and/or an interface bus 807, and most frequently, although not necessarily, are all interconnected and/or communicating through a system bus 804 on one or more (mother)board(s) 802 having conductive and/or otherwise transportive circuit pathways through which instructions (e.g., binary encoded signals) may travel to effectuate communications, operations, storage, etc. The computer systemization may be connected to a power source 886; e.g., optionally the power source may be internal. Optionally, a cryptographic processor 826 and/or transceivers (e.g., ICs) 874 may be connected to the system bus. In another embodiment, the cryptographic processor and/or transceivers may be connected as either internal and/or external peripheral devices 812 via the interface bus I/O. In turn, the transceivers may be connected to antenna(s) 875, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing DCB controller to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 829 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the DCB controller and beyond through various interfaces. Should processing requirements dictate a greater amount speed and/or capacity, distributed processors (e.g., Distributed DCB), mainframe, multi-core, parallel, and/or supercomputer architectures may similarly be employed. Alternatively, should deployment requirements dictate greater portability, smaller Personal Digital Assistants (PDAs) may be employed.

Depending on the particular implementation, features of the DCB may be achieved by implementing a microcontroller such as CAST's R8051XC2 microcontroller; Intel's MCS 51 (i.e., 8051 microcontroller); and/or the like. Also, to implement certain features of the DCB, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the DCB component collection (distributed or otherwise) and/or features may be implemented via the microprocessor and/or via embedded components; e.g., via ASIC, coprocessor, DSP, FPGA, and/or the like. Alternately, some implementations of the DCB may be implemented with embedded components that are configured and used to achieve a variety of features or signal processing.

Depending on the particular implementation, the embedded components may include software solutions, hardware solutions, and/or some combination of both hardware/software solutions. For example, DCB features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the DCB features. A hierarchy of programmable interconnects allow logic blocks to be interconnected as needed by the DCB system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the DCB may be developed on regular FPGAs and then migrated into a fixed version that more resembles ASIC implementations. Alternate or coordinating implementations may migrate DCB controller features to a final ASIC instead of or in addition to FPGAs. Depending on the implementation all of the aforementioned embedded components and microprocessors may be considered the "CPU" and/or "processor" for the DCB.

Power Source

The power source 886 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 886 is connected to at least one of the interconnected subsequent components of the DCB thereby providing an electric current to all subsequent components. In one example, the power source 886 is connected to the system bus component 804. In an alternative embodiment, an outside power source 886 is provided through a connection across the I/O 808 interface. For example, a USB and/or IEEE 1394 connection carries both data and power across the connection and is therefore a suitable source of power.

Interface Adapters

Interface bus(ses) 807 may accept, connect, and/or communicate to a number of interface adapters, conventionally although not necessarily in the form of adapter cards, such as but not limited to: input output interfaces (I/O) 808, storage interfaces 809, network interfaces 810, and/or the like. Optionally, cryptographic processor interfaces 827 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 809 may accept, communicate, and/or connect to a number of storage devices such as, but not limited to: storage devices 814, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 810 may accept, communicate, and/or connect to a communications network 813. Through a communications network 813, the DCB controller is accessible through remote clients 833*b* (e.g., computers with web browsers) by users 833*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed DCB), architectures may similarly be employed to pool, load balance, and/or otherwise increase the communicative bandwidth required by the DCB controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 810 may be used to engage with various communications network types 813. For example, multiple network interfaces may be employed to allow for the communication over broadcast, multicast, and/or unicast networks.

Input Output interfaces (I/O) 808 may accept, communicate, and/or connect to user input devices 811, peripheral devices 812, cryptographic processor devices 828, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 811 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 812 may be connected and/or communicate to I/O and/or other facilities of the like such as network interfaces, storage interfaces, directly to the interface bus, system bus, the CPU, and/or the like. Peripheral devices may be external, internal and/or part of the DCB controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the DCB controller may be embodied as an embedded, dedicated, and/or monitor-less (i.e., headless) device, wherein access would be provided over a network interface connection.

Cryptographic units such as, but not limited to, microcontrollers, processors 826, interfaces 827, and/or devices 828 may be attached, and/or communicate with the DCB controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 829. However, memory is a fungible technology and resource, thus, any number of memory embodiments may be employed in lieu of or in concert with one another. It is to be understood that the DCB controller and/or a computer systemization may employ various forms of memory 829. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 829 will include ROM 806, RAM 805, and a storage device 814. A storage device 814 may be any conventional computer system storage. Storage devices may include a drum; a (fixed and/or removable) magnetic disk drive; a magneto-optical drive; an optical drive (i.e., Blueray, CD ROM/RAM/Recordable (R)/Re-Writable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 829 may contain a collection of program and/or database components and/or data such as, but not limited to: operating system component(s) 815 (operating system); information server component(s) 816 (information server); user interface component(s) 817 (user interface); Web browser component(s) 818 (Web browser); database(s) 819; mail server component(s) 821; mail client component(s) 822; cryptographic server component(s) 820 (cryptographic server); the DCB component(s) 835; offer/discount determination component 841; checkout button embedding component 842; and/or the like (i.e., collectively a component collection). These components may be stored and accessed from the storage devices and/or from storage devices accessible through an interface bus. Although non-conventional program components such as those in the component collection, typically, are stored in a local storage device 814, they may also be loaded and/or stored in memory such as: peripheral devices, RAM, remote storage facilities through a communications network, ROM, various forms of memory, and/or the like.

Operating System

The operating system component 815 is an executable program component facilitating the operation of the DCB controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the DCB controller to communicate with other entities through a communications network 813. Various communication protocols may be used by the DCB controller as a subcarrier transport mechanism for interaction, such as, but not limited to: multicast, TCP/IP, UDP, unicast, and/or the like.

Information Server

An information server component 816 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the DCB controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the DCB database 819, operating systems, other program components, user interfaces, Web browsers, and/or the like.

Access to the DCB database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the DCB. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the DCB as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 817 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 818 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the DCB enabled nodes. The combined application may be nugatory on systems employing standard Web browsers.

Mail Server

A mail server component 821 is a stored program component that is executed by a CPU 803. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the DCB.

Access to the DCB mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 822 is a stored program component that is executed by a CPU 803. The mail client may be a conventional mail viewing application such as Apple Mail, Microsoft Entourage, Microsoft Outlook, Microsoft Outlook Express, Mozilla, Thunderbird, and/or the like.

Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 820 is a stored program component that is executed by a CPU 803, cryptographic processor 826, cryptographic processor interface 827, cryptographic processor device 828, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the DCB may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the DCB component to engage in secure transactions if so desired. The cryptographic component facilitates the secure accessing of resources on the DCB and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The DCB Database

The DCB database component 819 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the DCB database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the DCB database is implemented as a data-structure, the use of the DCB database 819 may be integrated into another component such as the DCB component 835. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 819 includes several tables 419*a*-*m*. A user table 819*a* includes fields such as, but not limited to: a user_ID, name, home_address, work_address, telephone_number, email, merchant_ID client_id, account_id, and/or the like. The user table may support and/or track multiple entity accounts on a DCB. A merchant/service provider table 819*b* includes fields such as, but not limited to: merchant_ID, merchant_name, merchant_ location, merchant_address, merchant_category_code, merchant_api_key, loyalty_program_ID and/or the like. A customer profile table 819*c* includes fields such as, but not limited to: user_ID, merchant_ID, payment_card_ID, preferred_payment_type, demographics, merchant_loyalty_level, and/or the like. A permissions table 819*d* includes fields such as, but not limited to: customer_ID, transaction_execution authorization_status, confirmation_authorization_status, billing_authorization_status, subscription_payment_authorization_status, and/or the like. A payment card table 819*e* includes fields such as, but not limited to: payment_card_id, user_id, identifier, brand, expiration_date, spending_limit, billing_address, issuer, name, nick_name, loyalty_program_ID, and/or the like. A billing agreement table 819f includes fields such as, but not limited to: customer_id, billing_id, billing_date, billing_amount_limit, confirmation_requirement, authentication_level, billing_authorization_status, and/or the like. A redemption table 819g includes fields such as, but not limited to: customer_id, loyalty_program_id, coupon_id, redemption_date, redemption_time, redemption_amount, redemption_type, transaction_id, and/or the like. A loyalty table 819h includes fields such as, but not limited to: loyalty_program_ID, rules, loyalty_currency_amount, loyalty_expiry_date, transaction_ ID, and/or the like. A discount table 819i includes fields such as, but not limited to: discount_ID, discount_value, discount_accepted_location, discount_expiry_date, and/or the like. A wishlist table 819j includes fields such as, but not limited to: wishlist_ID, merchant_ID, item_ID, and/or the like. A transaction table 819k includes fields such as, but not limited to: transaction_id, merchant_id, user_id, session_id, date, time, item_model, manufacturer, price, item_id, and/or the like. A products table 819l includes fields such as, but not limited to: product_id, merchant_id, item_id, and/or the like. An Account Balance table 819m includes fields such as, but not limited to: account_id, account_PAN, account_type, brand, expiration_date, spending_limit, billing_address, issuer_name, nickname, loyalty_program_ID, and/or the like.

In one embodiment, the DCB database may interact with other database systems. For example, employing a distributed database system, queries and data access by search DCB component may treat the combination of the DCB database, an integrated data security layer database as a single database entity.

In one embodiment, user programs may contain various user interface primitives, which may serve to update the DCB. Also, various accounts may require custom database tables depending upon the environments and the types of clients the DCB may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 819a-m. The DCB may be configured to keep track of various settings, inputs, and parameters via database controllers.

The DCB database may communicate to and/or with other components in a component collection, including itself, and/or facilities of the like. Most frequently, the DCB database communicates with the DCB component, other program components, and/or the like. The database may contain, retain, and provide information regarding other nodes and data.

The DCBs

The DCB component 835 is a stored program component that is executed by a CPU. In one embodiment, the DCB component incorporates any and/or all combinations of the aspects of the DCB that was discussed in the previous figures. As such, the DCB affects accessing, obtaining and the provision of information, services, transactions, and/or the like across various communications networks.

The DCB transforms inputs such as product page checkout request and user identification input (e.g., 211) via DCB components such as offer/discount determination component 841 and checkout button embedding component 842, into dynamic checkout button (e.g., 265) outputs.

The DCB component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the DCB server employs a cryptographic server to encrypt and decrypt communications. The DCB component may communicate to and/or with other components in a component collection, including itself, and/or facilities of the like. Most frequently, the DCB component communicates with the DCB database, operating systems, other program components, and/or the like. The DCB may contain, communicate, generate, obtain, and/or provide program component, system, user, and/or data communications, requests, and/or responses.

Distributed DCBs

The structure and/or operation of any of the DCB node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the DCB controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the DCB controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/ref erenceguide295.htm
and other parser implementations:
http://publib.boulder.ibm.com/infocenter/tivihelp/v2r1/index.jsp?topic=/com.ibm.IBMDI.doc/ref erenceguide259.htm
all of which are hereby expressly incorporated by reference.

In order to address various issues and advance the art, the entirety of this application for DYNAMIC CHECKOUT BUTTON APPARATUSES, METHODS AND SYSTEMS (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a DCB individual and/or enterprise user, database configuration and/or relational model, data type, data transmission and/or network framework, syntax structure, and/or the like, various embodiments of the DCB, may be implemented that enable a great deal of flexibility and customization. For example, aspects of the DCB may be adapted for customized communication between entities. While various embodiments and discussions of the DCB have been directed to dynamic checkout button, however, it is to be understood that the embodiments described herein may be readily configured and/or customized for a wide variety of other applications and/or implementations.

The invention claimed is:

1. A dynamic checkout button processor-implemented method, comprising: receiving, using one or more data processors, a product page checkout request from a portable user device associated with a user; querying, using the one or more data processors, for information associated with a merchant and the user; performing analytics, using the one or more data processors, on a website of the merchant or across the World Wide Web using the information queried to generate a result of interest to the user; generating, using the one or more data processors, dynamic images representing one or more financial accounts to be embedded into a wallet-associated checkout button, wherein the dynamic images comprise a visual indication of card art corresponding to the one or more financial accounts and a visual indication of the result of interest to the user, wherein the visual indication of the card art includes the card art turning a first color if the corresponding financial account has a high balance and the card art turning a second color if the corresponding financial account has a low balance; transmitting, via the one or more data processors, the dynamic images to the portable user device; in response to receiving the dynamic images: embedding the dynamic images into the wallet-associated checkout button; and, displaying the wallet-associated checkout button with the dynamic images on a display of the portable user device portable user device.

2. The method of claim 1, wherein the product page checkout request results from a World Wide Web browsing of product listings of one or more merchants.

3. The method of claim 1, wherein the dynamic images include a visual indication of a threshold of the one or more financial accounts.

4. The method of claim 3, wherein the threshold is customizable and user specific.

5. The method of claim 4, wherein the threshold is customizable and user specific based upon access to a wallet account associated with the user and the one or more financial accounts.

6. The method of claim 5, wherein the wallet account stores the user's profile information, payment methods information, and shipping address.

7. The method of claim 1, wherein the step of performing analytics further comprises determining a maximum cash back and wherein the result of interest to the user is the maximum cash back.

8. The method of claim 1, wherein the dynamic image is embedded into a link position in the wallet-associated checkout button for display on the display of the portable user device.

9. The method of claim 1, wherein the wallet: associated checkout button occupies an area within the display of the portable user device.

10. The method of claim 9, wherein the dynamic images are displayed within the area occupied by the wallet-associated checkout button.

11. The method of claim 1, wherein the product page checkout request and the dynamic images are transmitted over one or more communications networks.

12. The method of claim 1, wherein the portable user device is a wireless mobile communications device.

13. The method of claim 1, wherein the step of performing analytics further comprises determining a historical lowest price of a product on the website of the merchant and wherein the result of interest to the user is the historical lowest price of the product on the website of the merchant.

14. The method of claim 1, wherein the step of performing analytics further comprises determining a price of a product on the website of another merchant and wherein the result of interest to the user is the price of a product on the website of the other merchant.

15. The method of claim 1, wherein the visual indication comprises a message further comprised of text.

16. The method of claim 1, wherein the first color is red.

17. The method of claim 1, wherein the second color is green.

18. The method of claim 1, wherein a low balance is a zero balance.

* * * * *